Figure 3:
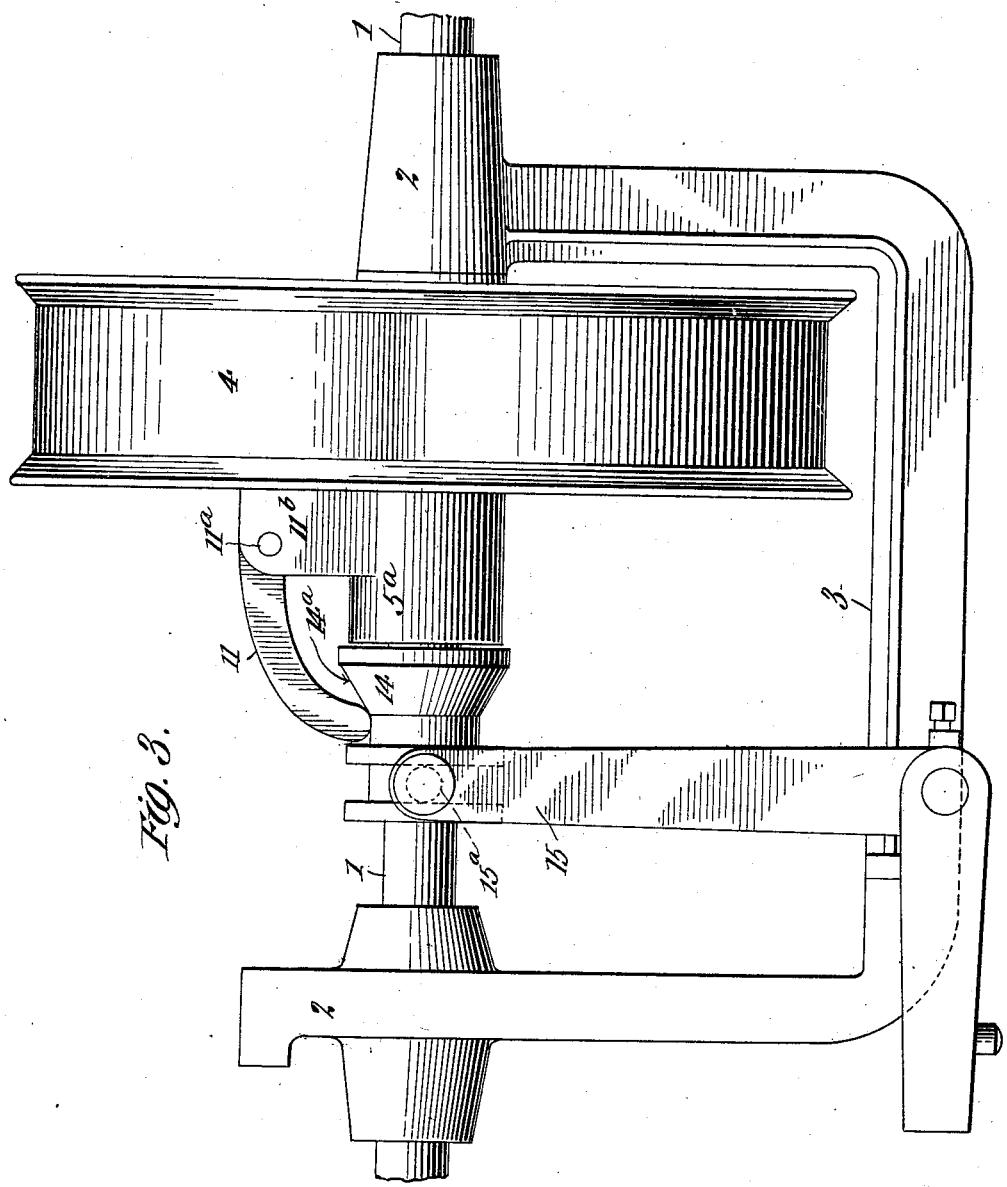

J. C. BREWIN.
FRICTION CLUTCH.
APPLICATION FILED DEC. 14, 1910.
1,008,945.
Patented Nov. 14, 1911.
2 SHEETS—SHEET 1.
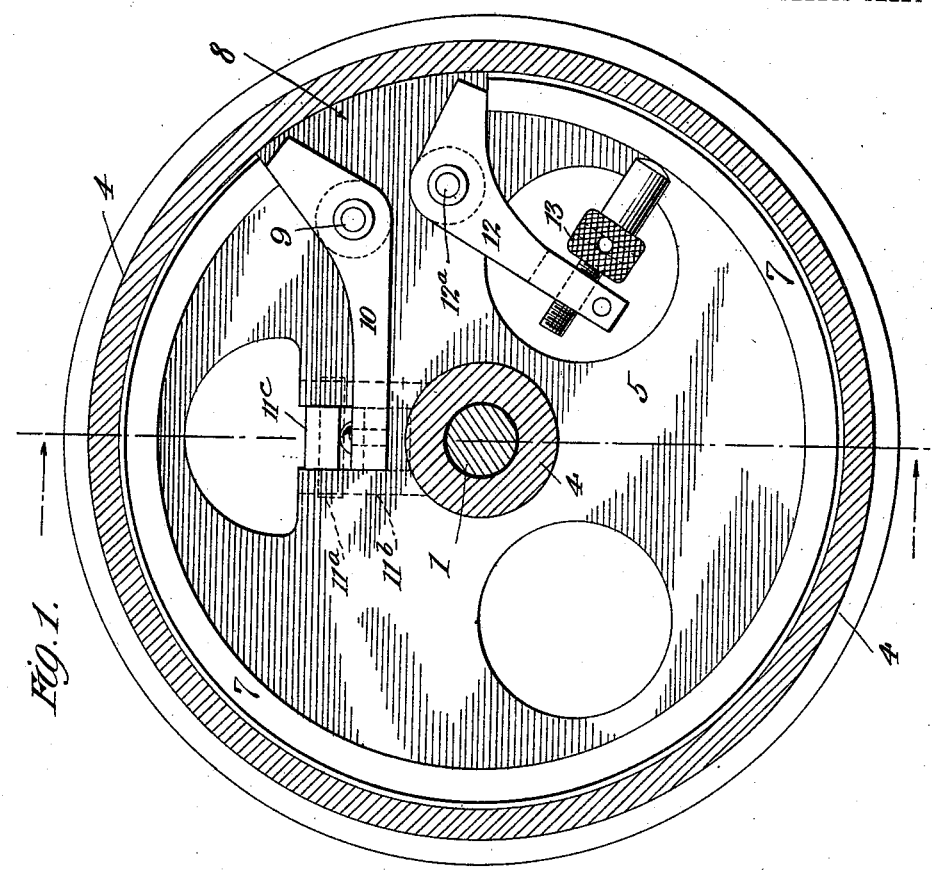
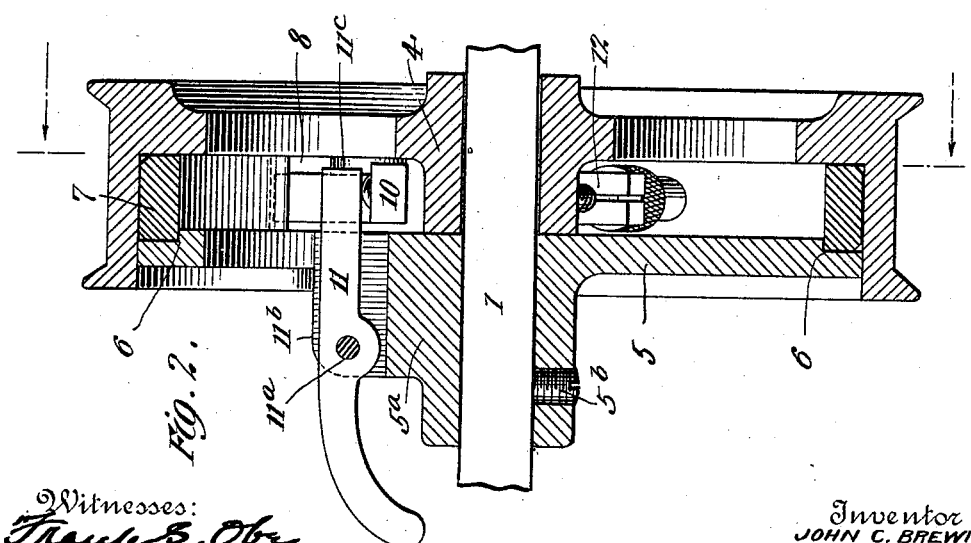
Inventor
JOHN C. BREWIN

J. C. BREWIN.
FRICTION CLUTCH.
APPLICATION FILED DEC. 14, 1910.

1,008,945.

Patented Nov. 14, 1911.

2 SHEETS—SHEET 2.

Witnesses:

Inventor:
JOHN C. BREWIN
By his Attorneys

UNITED STATES PATENT OFFICE.

JOHN C. BREWIN, OF PHILADELPHIA, PENNSYLVANIA.

FRICTION-CLUTCH.

1,008,945.   Specification of Letters Patent.   Patented Nov. 14, 1911.

Application filed December 14, 1910. Serial No. 597,383.

*To all whom it may concern:*

Be it known that I, JOHN C. BREWIN, a citizen of the United States, residing at Philadelphia, in the county of Philadelphia and State of Pennsylvania, have invented certain new and useful Improvements in Friction-Clutches, of which the following is a specification, reference being had therein to the accompanying drawing.

This invention relates to that type of friction clutches in which the connection between the driving and driven elements is effected by an expansion member carried by one of the parts and adapted to be expanded to frictionally engage the other element.

The invention is especially applicable to clutches of this type in which the driving element is in the form of a constantly rotating pulley or equivalent device, and in which the driven element is in the form of a shaft normally at rest, the expansion member, usually in the form of a ring, being sustained by the shaft and adapted by its expansion to engage the inner surface of the pulley; whereby the motion of the pulley will be transmitted to the shaft. It is manifest, however, that this arrangement of the parts may be reversed, that is, the shaft may be the driving element and the pulley the driven element.

The invention consists of various improvements in clutches of this character designed to render the action of the expansion ring speedy and certain in its engagement with the pulley; to provide for the convenient and effective adjustment of the expansion ring to take up wear between the same and the pulley; to render the arrangement and construction of the parts compact and simple; and generally to improve the action and operation of the mechanism as a whole.

In the accompanying drawings: Figure 1 is a face view of my improved mechanism with certain parts in section. Fig. 2 is a longitudinal section on the line *a—a* of Fig. 1. Fig. 3 is a side elevation, partly in section, showing the lever mechanism for controlling the action of the clutch.

Referring to the drawings: 1 indicates the driven element—in the present instance in the form of a shaft normally at rest and mounted for rotation in bearings 2 in a suitable frame 3. Loosely mounted on the shaft is a driving element 4—in the present instance in the form of a pulley adapted to be rotated constantly from any suitable source of power.

5 indicates a clutch disk provided with a hub $5^a$ encircling the shaft and secured firmly thereto, preferably by means of a set-screw $5^b$ extending through the hub and engaging the shaft. The outer peripheral edge of the disk terminates within the peripheral flange of the pulley, and is formed in its side face, near its edge, with a circumferential recess 6, in which is seated an expansion ring 7 fitting normally loosely within the peripheral flange of the pulley, and adapted when expanded to impinge and bind against the inner surface of said flange, by which action a driving connection is effected between the pulley and shaft.

The expansion ring extends continuously for nearly the entire circumference of the pulley flange, a short space being left between the disconnected ends of the ring, as indicated at 8. Pivoted to the side of the clutch disk on an axis 9 parallel with the shaft's axis, is an expansion lever 10, the outer end of which is adapted to engage one end of the expansion ring, while its inner end terminates adjacent the center of the disk in position to be engaged by a clutch lever 11. The clutch lever extends longitudinally of the shaft and is pivoted on a transverse axis $11^a$ between ears $11^b$ extending outwardly from the disk hub, one end of the lever $11^c$ being extended over the inner end of the expansion lever in position to engage it, while the opposite end of the clutch lever is extended at the side of the shaft beyond the disk's hub, so that this end of the clutch lever may be acted on by means hereinafter described to move the same outwardly and correspondingly move its opposite end inwardly. By this action, the expansion lever will be rocked on its axis and its outer end caused to move the end of the expansion ring in a circumferential direction to effect the expansion of the same.

The opposite end of the expansion ring is engaged by the outer end of a lever 12 pivoted between its ends on an axis $12^a$ parallel with the shaft's axis and carrying at its inner end a radially extending pin 13, the outer end of which engages the inner surface of the expansion ring some distance from its end. This lever, by its engagement with the end of the expansion ring, will be rocked on its axis by the circumferential movement of the ring due to the action of the expansion lever on the opposite end, and such rocking action of lever 12 will force the radial pin 13 outwardly against the inner side of the ring. This will cause the ring at this point to be moved outwardly and bind against the inner surface of the pulley, while at the same time checking further circumferential movement of the ring against the lever 12, so that the continued movement of the expansion lever will expand the ring throughout its extent and cause the same to bind evenly and firmly against the inner surface of the pulley.

It will be observed that by reason of the provision of the radially acting pin 13, the expansion ring, in addition to the expansive action caused by the separation of its ends, is subjected to a distinct expansive force acting directly thereon between the ends of the ring and operating to urge the same outwardly in a radial direction, whereby the quick and sure contact of the ring is assured. This I deem an important feature of my invention, and it is manifest that the detailed mechanism for accomplishing the same may be variously modified within the knowledge of the skilled mechanic without departing from the limits of the invention, the essential feature of the invention in this connection being means, broadly, for subjecting the ring to an outward pressure at a point between its ends, in addition to its expansive movement due to the separation of its ends.

The radial pin 13 is connected with the lever 12 in such manner that it may be adjusted relatively thereto to and from the ring. This is conveniently effected by threading the inner end of the pin into the lever. The purpose of this arrangement is to take up wear that might occur between the outer surface of the ring and inner surface of the pulley, the movement of the pin outwardly relative to the lever causing such a change in the relation of the ring to the other mechanism that any lost motion between them, due to wear, will be taken up and their proper operative relation maintained.

It will be noted that the ring is entirely disconnected at its ends from the operating mechanism. As a result of this fact, the ring will give a more uniform contact with the pulley, as it is free to move outwardly uniformly at every part in relation to the operating mechanism, and is not restrained by any permanent connection with the operative parts, as has heretofore been the case.

As a result of the form and relation of the two levers 10 and 12, and their action on the ends of the expansion ring, a leverage of about 4:1 on the ring is produced, without requiring any extension of the shaft at the pulley side of the clutch beyond that suitable for giving the shaft a bearing at this point. Consequently, the mechanism may be included in small limits and arranged in compact form.

The end of the clutch lever may be moved outwardly in any suitable manner to actuate the ring-expanding mechanism, but I prefer to adopt for this purpose an actuating cone-member 14 mounted to slide back and forth on the shaft 1 adjacent the end of the clutch lever, the said cone member being formed with an inclined or sloping circumferential surface 14$^a$ adapted to engage the end of the lever. Normally and when the clutch is disengaged, the lowest part of the sloping surface will be in engagement with the end of the lever, so that the lever will extend in a horizontal position, as shown in Fig. 2. When, however, the cone member is moved along the shaft and in the direction of the arrow of Fig. 3, the sloping surface will engage with the lever and move its end outwardly, thereby depressing the opposite end of the lever and actuating the expansion lever as hereinbefore described. Any appropriate means may be employed for shifting the cone member on the shaft to thus control the clutch, one convenient form of mechanism being shown, and consisting of a hand lever 15 pivoted to the frame of the machine and having a pin 15$^a$ engaging in a circumferential groove in the cone member, the movement of the hand lever back and forth causing the cone member to be correspondingly shifted.

In the accompanying drawings I have illustrated my invention in the particular form which I prefer to adopt and which has been found in practice to answer to a satisfactory degree the ends to be attained, but it will be understood that my invention is not limited to any particular form or construction of the parts except in so far as such limitations are specified in the claims.

Having thus described my invention, what I claim is:—

1. In a friction clutch, and in combination with a driving element, a driven element, an expansion member sustained by one of said elements, means for moving one end of said member circumferentially, and a movable device engaged by the other end of said member, said movable device also engaging the expansion member between its ends to apply outward pressure thereto.

2. In a friction clutch, and in combination with a driving element, a driven element, an expansion member sustained by one of said elements and adapted to engage the other, means for moving one end of the member circumferentially, a movable device engaged by the other end of the expansion member, a pressure pin carried and operated by said movable device and engaging the expansion member, and means for adjusting the pin relatively to the movable device.

3. In a friction clutch, and in combination with a driving element, and a driven element, one of said elements being in the form of a shaft and the other in the form of a pulley, a clutch disk fixed to the shaft, an expansion ring adapted to engage the inner surface of the pulley, an expansion lever pivoted to the disk and engaging one end of the ring, means for actuating said lever, and a movable device carried by the disk and acted on by the other end of the ring and operating to apply positive outward pressure to the ring.

4. In a friction clutch, and in combination with a driving element, and a driven element, one of said elements being in the form of a shaft and the other in the form of a pulley, a clutch disk fixed to the shaft, an expansion ring adapted to engage the inner surface of the pulley, an expansion lever pivoted to the disk and engaging one end of the ring, means for actuating said lever, a second lever pivoted to the clutch disk and engaged by the other end of the ring, said second lever being formed and arranged to apply pressure to the ring between its ends.

In testimony whereof I have affixed my signature in presence of two witnesses.

JOHN C. BREWIN.

Witnesses:
EDWARD TREDICK,
JOSEPH B. GODSHALL.

Copies of this patent may be obtained for five cents each, by addressing the "Commissioner of Patents, Washington, D. C."